Patented July 18, 1933 1,918,812

UNITED STATES PATENT OFFICE

RALPH W. KERR, OF YONKERS, AND HENRY BERLIN, OF NEW YORK, N. Y., ASSIGNORS TO INTERNATIONAL PATENTS DEVELOPMENT COMPANY, OF WILMINGTON, DELAWARE, A CORPORATION OF DELAWARE

TREATMENT OF STEEP WATER

No Drawing. Application filed July 12, 1930. Serial No. 467,619.

This invention relates to the treatment of corn steep water for the purpose of preventing the fouling or scaling of the evaporators when the steep water is boiled to concentrate it.

In the manufacture of starch from corn by the wet method it is customary, as a first step in the process, to steep the corn in warm water containing sulphur dioxide, a usual method being to steep the corn in a series of steeping vessels through which, by the successive cutting in and out units containing the fresh corn and steeped corn and the adjusting of the connections for the steep water, the corn may be said to pass through the system in one direction and the steep water, on the counter current principle, in the other direction, with the water (either fresh water or gluten overflow water) introduced, in the first instance, upon the oldest corn in the last steep and drawn off from the fresh corn in the first steep. The steep water thus removed from the steeping system carries with it soluble substances such as proteins and mineral phosphates or other salts and to save these substances which have value it is customary to evaporate the steep water which, in the concentrated state, is frequently mixed with the bran and gluten constituents of the corn in the making of cattle food.

The boiling of the steep water is attended by an objectionable fouling and scaling of the interior of the evaporators. Apparently two kinds of scale are formed. One is called "rubber" scale and consists largely of protein material, with which other materials in suspension may be aggregated. The other is called "hard" scale and consists largely of mineral salts. Actually the deposits may be made up of both types of scale in intimate mixture. The scale is particularly objectionable when it forms on the steam pipes of the evaporators because of its heat insulation; and it has been the practice to periodically boil out the evaporators for several hours with caustic alkali or other re-agents that will act upon to dissolve the scale. This practice involves trouble and expense besides keeping a very considerable amount of equipment out of operation.

It has been proposed to overcome the scaling difficulty by adding acids to the steep water, but this method is not wholly effective, and to be effective at all the acids must be used in such large quantities as to make the expedient impractical on account of cost.

The present invention is based upon the discovery that if the steep water before it is sent to the evaporator is kept for a time under certain conditions, particularly within certain temperatures and at suitable acidities, bio-chemical activity is developed which converts the protein scale-forming substances into products that do not ordinarily form the rubber scale when heated in the vacuum pans, while at the same time conditions are created so that on boiling, the mineral salts are kept in solution (together perhaps with some of the protein substances) so that the hard scale is not formed.

The time which this treatment requires to be effective may be reduced by agitating or aerating the steep water during the incubation period.

If the steeping system is such that the steep water issues from the system in a sterile condition, it will be necessary to inoculate the steep water, before treatment, with organisms and/or enzymes which act, as above described, on the proteins; and such inoculation may be desirable, to hasten the desired action if the steeping operation has to a considerable degree destroyed micro-organic life on the corn without actually sterilizing the same.

If the carbohydrate content of the steep water is low, it is desirable in order to shorten the treatment to add a carbohydrate to the steep water.

The process of this invention may be carried out as follows: The steep water from the steeping system is run into a storage vessel where it is kept at a temperature as near as may be to the optimum temperature or temperatures of the organism or organisms which act, in the manner above mentioned, upon the soluble proteins in the steep water. According to our experience the most favorable temperature is approximately 120° F. which probably represents the optimum or average optimum temperatures for the micro-organism or micro-organisms or enzymes which do this work. At the temperature of 120° the conversion of the rubber scale forming substances to non-scale forming substances seems to be accomplished in the shortest time. Any temperature however between 110° F. and 130° F. will suffice and it is possible to accomplish the desired results even at higher or lower temperatures, for instance at temperatures between 95° F. and 140° F., but with the higher or lower temperatures the time required is increased to such an extent that the operation may cease to be profitable. For a range of temperatures of from 110° to 130° F. the time required for the treatment will ordinarily be from 24 to 48 hours, assuming that the steep water contains the normal amount of carbohydrate, say 15% to 20% dextrose (on dry substance basis). It is not known definitely which of the micro-organisms found on the coin take part in this work but our experience indicates that the bacillus subtillis group and certain lactic acid bacteria, and probably other species, are the active agents and that the soluble proteins are split or hydrolyzed by the action of these organisms into peptones and/or amino acids. The temperatures and acidities employed are considerably above the optimum conditions for putrefactive organisms of the type which split proteins into ammonia. It is not possible to employ without control organisms of the latter type. They would necessarily tend to make the steep water alkaline through the excessive production of ammonia; and an alkaline steep water cannot be satisfactorily boiled in vacuum pans. The splitting or hydrolyzation which actually takes place in accordance with the present invention gives products such as peptones and amino acids which are more or less neutral, and are not coagulable by heat. In the practice of the present invention, the acidity of the steep water may be somewhat increased by the bio chemical treatment described. That is, if the steep water has an acidity represented by pH=4.4, before treatment the pH may be 4.2 at the end of incubation.

The period of treatment can be shortened by agitating or aerating the liquid. This may be done in any suitable manner. For example, the liquid can be pumped continuously, or intermittently, out of the bottom of the tank and into the top (preferably with a splashing action). This treatment is effective to shorten the incubation period apparently because it brings fresh oxygen to the organisms and also carries off carbon dioxide and sulphur dioxide, which are volatile acids, so that the lactic or similar relatively non-volatile acids can develop and inhibit the growth of undesirable putrefactive bacteria. Lactic acid is mentioned merely as typical. Oxy-butyric or butyric or succinic acids or other acids may be produced depending upon the particular organisms taking part in the reaction.

With the methods of steeping which are in commonest use at the present time the steep water is withdrawn from the steeping system at low sulphur dioxide content, immediately after passing through the unit simply containing the fresh corn, so that the steep water undergoing treatment in accordance with our invention is certain to contain an abundance of microbic life and/or active enzymes. Should a steeping system be employed which, for example, because of the high acidities and/or temperatures employed produces; a sterile or nearly sterile light steep water effluent which will be evidenced by failure of the steep water when treated in accordance with this invention to react as herein described. it would be necessary, or at least desirable to inoculate the steep water, before being incubated, with micro-organisms and/or enzymes of the species required. This could be accomplished most conveniently, by simply passing the steep water through or in contact with bodies of fresh corn. In effect that is what is done, within the steeping system, by the present counter-current method of steeping.

The steep water will contain various amounts of carbohydrates, principally dextrose, depending upon the particular method of steeping employed. For example, the steep water may contain 15 per cent to 20 per cent of dextrose and it is upon this assumption that we have stated that the incubation period should be from 24 to 48 hours. The carbohydrate content of the steep water may, however, be much below this figure and in one case we have found it as low as 2 per cent dextrose (dry substance basis). This water required an incubation period of about 72 hours. Therefore when the dextrose content of the steep water is low, it is preferable, in order to save time, to add dextrose to it. A cheap material suitable for this purpose and containing dextrose is the hydrol or mother liquor which is a by-product in the manufacture of corn sugar. The importance of carbohydrates in the bio-chemical reaction is that they are a source of acidity. The presence of these acids, if not necessary, is at least beneficial as their presence increases the speed of the desired protein hydrolysis. The acidity of the steep water tends to keep in solution the mineral salts, and probably also, to some extent, any protein which has not been acted upon by the micro-organisms.

It will be understood that we desire to cover by patent all modifications of the above described procedures within the scope of the appended claims. The term "micro-organisms" as used in the claims is intended to include enzymes secreted or produced by bacteria or other microbic life.

We claim:

1. The method of treating corn steep water containing micro-organisms native to the corn to prevent scaling when the steep water is evaporated which consists in maintaining the steep water after steeping and before evaporation at a temperature between 95° and 140° F. until the scale forming substances are converted into non-scale forming substances and thereafter evaporating the steep water.

2. The method of treating corn steep water containing micro-organisms native to the corn to prevent scaling when the steep water is evaporated which consists in maintaining the steep water after steeping and before evaporation at a temperature between 95° and 140° F. for from approximately 24 hours to 96 hours and thereafter evaporating the steep water.

3. The method of treating corn steep water containing micro-organisms native to the corn to prevent scaling when the steep water is evaporated which consists in maintaining the steep water after steeping and before evaporation at a temperature between 110° and 130° F. until the scale forming substances are converted into non-scale forming substances and thereafter evaporating the steep water.

4. The method of treating corn steep water containing micro-organisms native to the corn to prevent scaling when the steep water is evaporated which consists in maintaining the steep water after steeping and before evaporation at a temperature of approximately 120° F. until the scale forming substances are converted into non-scale forming substances and thereafter evaporating the steep water.

5. The method of treating corn steep water containing micro-organisms native to the corn to prevent scaling when the steep water is evaporated which consists in maintaining the steep water after steeping and before evaporation at a temperature between 110° and 130° F. for from approximately 24 to 48 hours and thereafter evaporating the steep water.

6. The method of treating corn steep water containing micro-organisms native to the corn to prevent scaling when the steep water is evaporated which consists in maintaining the steep water after steeping and before evaporation at a temperature between 95° and 140° F. and at the same time agitating the liquid until the scale forming substances are converted into non-scale forming substances and thereafter evaporating the steep water.

7. The method of treating corn steep water to prevent scaling when the steep water is evaporated which consists in inoculating the steep water after steeping and before evaporation with micro-organisms native to the corn and maintaining it thereafter at a temperature between 95° and 140° F. until the scale forming substances are converted into non-scale forming substances and thereafter evaporating the steep water.

8. The method of treating corn steep water containing micro-organisms native to the corn to prevent scaling when the steep water is evaporated which consists in maintaining the steep water after steeping and before evaporation at a temperature between 110° and 130° F. and aerating the same until the scale forming substances are converted into non-scale forming substances and thereafter evaporating the steep water.

9. The method of treating corn steep water containing micro-organisms native to the corn to prevent scaling when the steep water is evaporated which consists in maintaining the steep water after steeping and before evaporation at a temperature of approximately 120° F. for from 24 to 48 hours while subjecting the same to aeration and thereafter evaporating the steep water.

10. The method of treating corn steep water containing micro-organisms native to the corn to prevent scaling when the steep water is evaporated which consists in adding a carbohydrate to the steep water after steeping and before evaporation and maintaining the steep water at a temperature between 95° and 140° F. until the scale forming substances are converted into non-scale forming substances and thereafter evaporating the steep water.

11. The method of treating corn steep water containing micro-organisms native to the corn to prevent scaling when the steep water is evaporated which consists in adding a carbohydrate to the steep water after steeping and before evaporation and maintaining the steep water at a temperature between 110° F. and 130° F. for approximately 24 hours to 48 hours and thereafter evaporating the steep water.

12. Method of treating corn steep water containing micro-organisms native to the corn to prevent scaling when the steep water is evaporated which consists in adding a carbohydrate to the steep water after steeping and before evaporation, maintaining it at a temperature between 110° and 130° F. for a period of approximately 24 to 48 hours and agitating the liquid to aerate it and thereafter evaporating the steep water.

13. Method of treating corn steep water containing micro-organisms native to the corn to prevent scaling when the steep water is evaporated which comprises inoculating the steep water after steeping and before evaporation with micro-organisms by passing it in contact with fresh corn, adding a carbohydrate thereto, maintaining the steep water at a temperature between 110° and 130° F. for a period of approximately 24 to 48 hours and aerating the liquid during this period and thereafter evaporating the steep water.

RALPH W. KERR.
HENRY BERLIN.